(12) United States Patent
Huening (10) Patent No.: US 11,491,855 B2
(45) Date of Patent: Nov. 8, 2022

(54) PROTECTIVE COVER WITH GROUND SURFACE SEAL

(71) Applicant: Kenneth J. Huening, Los Gatos, CA (US)

(72) Inventor: Kenneth J. Huening, Los Gatos, CA (US)

( * ) Notice: Subject to any disclaimer, the term of this patent is extended or adjusted under 35 U.S.C. 154(b) by 194 days.

(21) Appl. No.: 16/760,849

(22) PCT Filed: Oct. 12, 2018

(86) PCT No.: PCT/US2018/055616
§ 371 (c)(1),
(2) Date: Apr. 30, 2020

(87) PCT Pub. No.: WO2019/089209
PCT Pub. Date: May 9, 2019

(65) Prior Publication Data
US 2021/0170850 A1 Jun. 10, 2021

Related U.S. Application Data (60) Provisional application No. 62/580,870, filed on Nov. 2, 2017.

(51) Int. Cl.
*B60J 11/04* (2006.01)

(52) U.S. Cl.
CPC ..................... *B60J 11/04* (2013.01)

(58) Field of Classification Search
CPC ........................................................ B60J 11/04
USPC ............. 296/136.01, 136.07, 136.1; 150/166
See application file for complete search history.

(56) References Cited

U.S. PATENT DOCUMENTS

| 2,243,981 | A | * | 6/1941 | Rowan | B60J 11/00 296/136.1 |
| 2,311,514 | A | * | 2/1943 | Bramblett | B60J 11/00 296/136.1 |
| 2,994,356 | A | * | 8/1961 | Fleming | B60J 11/00 293/1 |
| 3,862,876 | A | * | 1/1975 | Graves | E04G 21/28 47/9 |

(Continued)

FOREIGN PATENT DOCUMENTS

| CN | 203832216 U | 9/2014 |
| CN | 104507341 A1 | 4/2015 |
| FR | 3037288 A1 | 12/2016 |

OTHER PUBLICATIONS

International Search Report and Written Opinion for related PCT application No. PCT/US2018/055616, dated Dec. 11, 2018, in 12 pages.

(Continued)

*Primary Examiner* — Joseph D. Pape
(74) *Attorney, Agent, or Firm* — Procopio, Cory, Hargreaves & Savitch LLP (57) ABSTRACT

Protective cover with ground surface seal. In an embodiment, the protective cover comprises a protective top cover, comprising one or more edges, and an apron extending from the one or more edges of the protective top cover. The edge of the apron, opposite the one or more edges of the protective cover, may comprise a sealing tube that contains a compressible, contouring material, so as to form a seal between the edge of the apron and a ground surface when the protective cover is deployed.

16 Claims, 6 Drawing Sheets

(56) References Cited

U.S. PATENT DOCUMENTS

| | | | | |
|---|---|---|---|---|
| 4,261,401 A | * | 4/1981 | Hickey | B65D 85/68 |
| | | | | 206/524.8 |
| 5,497,819 A | * | 3/1996 | Chiang | B60J 11/00 |
| | | | | 296/136.01 |
| 2001/0038226 A1 | | 11/2001 | Hoenack | |
| 2002/0105207 A1 | | 8/2002 | McGrath | |
| 2014/0042771 A1 | | 2/2014 | Lo | |

OTHER PUBLICATIONS

Extended European Search Report for related EP Application No. 18872549.3 dated Jul. 7, 2021, 10 pages.

* cited by examiner

PROTECTIVE COVER WITH GROUND SURFACE SEAL

CROSS-REFERENCE TO RELATED APPLICATIONS

This application claims priority to U.S. Provisional Patent App. No. 62/580,870, filed on Nov. 2, 2017 the entirety of which is hereby incorporated herein by reference.

BACKGROUND

Field of the Invention

The embodiments described herein are generally directed to a protective cover, and, more particularly, to a protective cover with a ground surface seal for protecting an object (e.g., vehicle, furniture, etc.) from intrusion by external influences, such as rodents, insects, weather (e.g., wind, rain, snow, etc.), and the like.

Description of the Related Art

Conventional protective covers do not provide any seal at the ground surface. Unfortunately, this allows intrusion by external influences, which can damage the object being covered. External influences may include, without limitation, rodents, insects, wind, rain, snow, and/or other weather, and/or any other influence that can penetrate a gap or loose fit between an edge of the protective cover and the ground. Thus, what is needed is a protective cover with a ground surface seal to protect the object from such influences.

SUMMARY

Accordingly, a protective cover with a ground surface seal is disclosed. In an embodiment, the protective cover comprises: a protective top cover comprising one or more edges; and an apron extending from the one or more edges of the protective top cover, wherein an edge of the apron, opposite the one or more edges of the protective top cover, comprises a sealing tube that contains a compressible, contouring material, so as to form a seal between the edge of the apron and a ground surface when the protective cover is deployed. The apron may be detachable from the one or more edges of the protective top cover. For example, the apron may be attached to the one or more edges of the protective top cover by a zipper.

In an embodiment, the apron is at least twelve inches wide between the one or more edges of the protective top cover and the sealing tube. The apron may comprise a single segment whose ends are fixed to each other at an overlap region. Alternatively, the apron may comprise a plurality of segments, wherein each end of each segment overlaps with an adjacent end of an adjacent segment at an overlap region. In either case, the overlap region may be at least three inches wide.

In an embodiment, each end may be attachable and detachable to another end (e.g., the opposite end if the apron is embodied as a single segment, or adjacent ends if the apron is embodied as a plurality of segments) by a first fastener. The first fastener may comprise Velcro™. Alternatively, each end may be permanently fixed to the overlapping end (e.g., by adhesive, stitching, and/or the like).

In an embodiment, at least one end of the sealing tube of each segment (e.g., whether a single segment or a plurality of segments are used) may comprise a second fastener to close the at least one end of the sealing tube, so as to seal the contouring material within the sealing tube, and open the at least one end of the sealing tube, so as to provide access to the contouring material within the sealing tube. The second fastener may comprise Velcro™. Alternatively, the sealing tube may be permanently closed with the contouring material inside. In either case, the contouring material may comprise sand. In addition, the sealing tube may be substantially cylindrical, and the substantially cylindrical sealing tube may have a diameter or width of at least two inches.

In an embodiment, the protective cover is configured to cover a vehicle. Alternatively, the protective cover is configured to cover furniture.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, a protective cover with a ground surface seal is disclosed. The protective cover may be used indoors or outdoors to store, cover, and protect objects (e.g., vehicles, furniture, etc.) from weather (e.g., wind, rain, snow, etc.), occupation or damage by rodents or insects, and/or the like. The cover may either loosely conform to the object (e.g., generic cover, such as for furniture) or tightly conform to the object (e.g., custom cover, such as a custom vehicle cover, for example, shaped for a particular vehicle). While the cover will be primarily described and illustrated herein as a vehicle cover, it should be understood that the cover may be sized and adapted to cover any object, including, without limitation, indoor and/or outdoor furniture (e.g., chairs, tables, grills, dressers, shelves, etc.).

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Figure 1A:
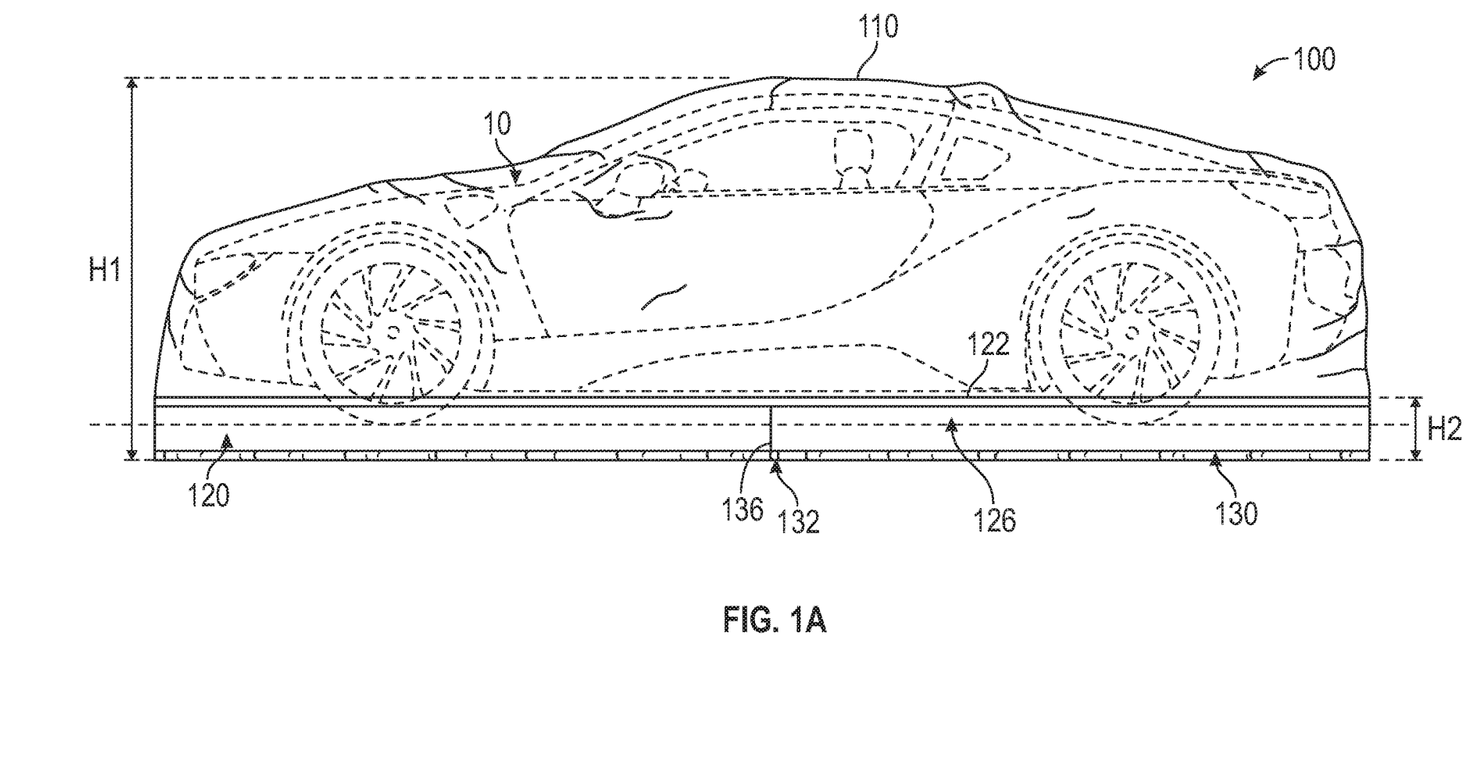
FIGS. 1A and 1B illustrate a protective cover, according to alternative embodiments.
Figure 1B:
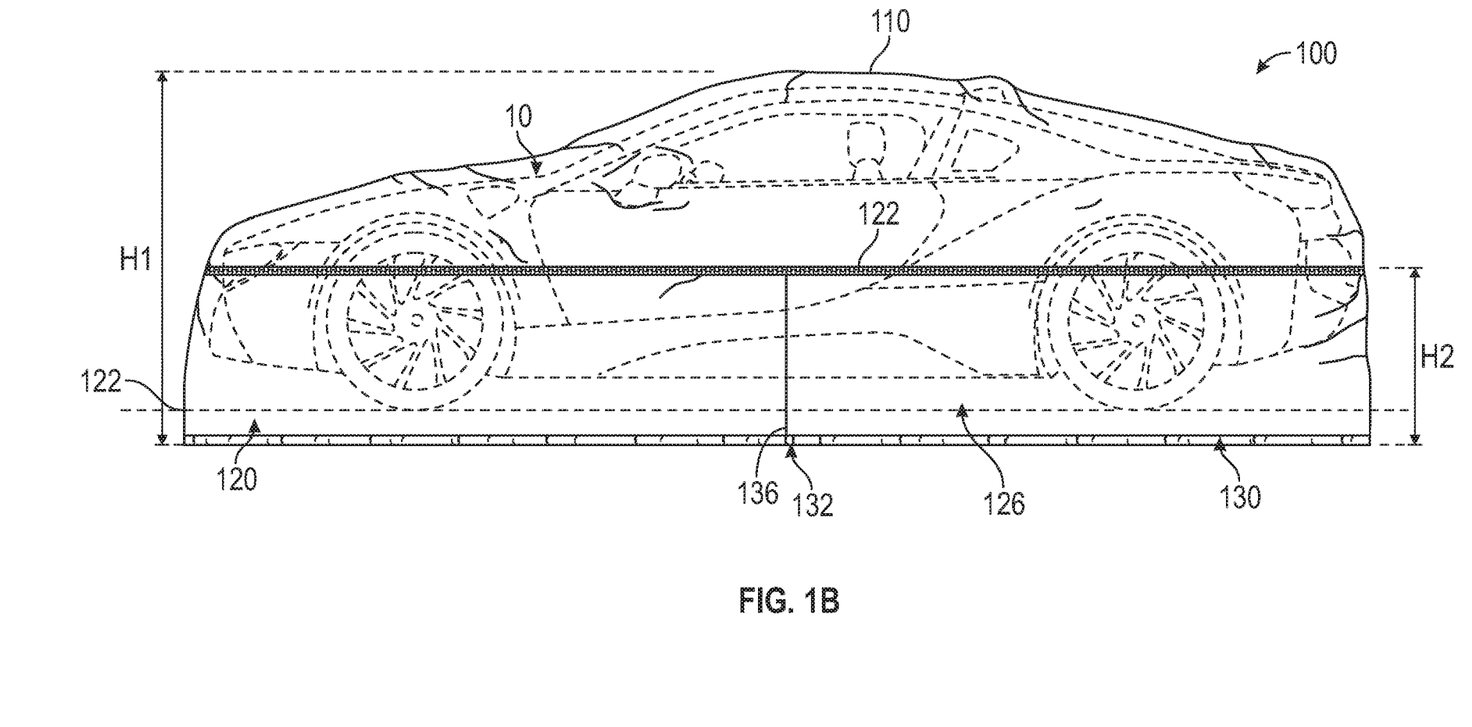
Figure 1C:
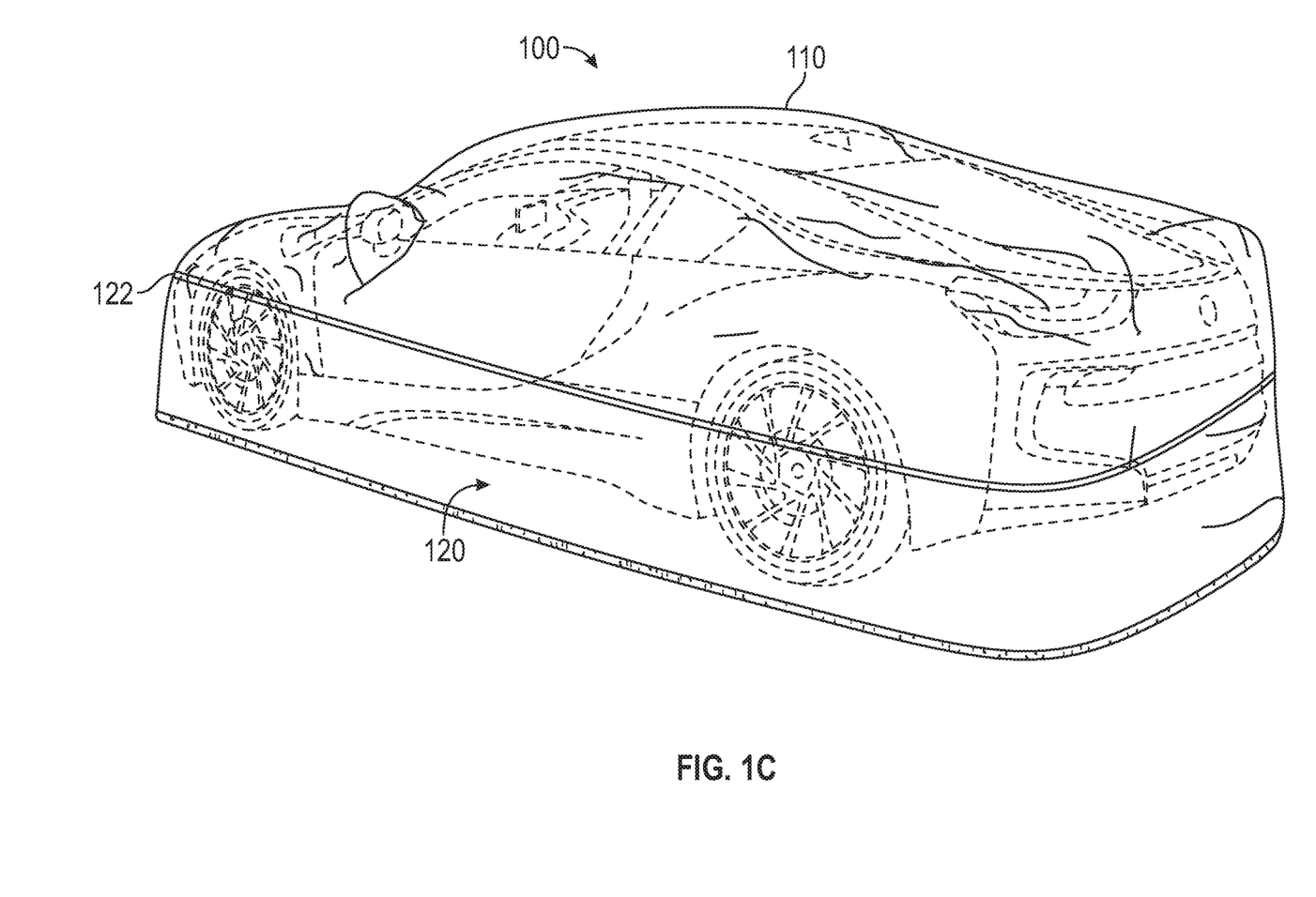
FIG. 1C illustrates a perspective view of a protective cover, according to an embodiment.

FIGS. 1A and 1B illustrate a protective cover with a ground surface seal, according to alternative embodiments, and FIG. 1C illustrates a perspective view of the protective cover illustrated in FIG. 1B, according to an embodiment. As illustrated, in both embodiments, the protective cover 100 comprises a protective top cover 110 and an apron 120. Protective top cover 110 may be made of a breathable, sun-reflective, and durable material. Apron 120 may be made of a water-proof or water-resistant material, which may be thicker than protective top cover 110, and which has a height $H_2$. Protective top cover 110 and apron 120 may be made of the same material or different material. Furthermore, while protective top cover 110 and apron 120 are illustrated as separate components of protective cover 100, in an alternative embodiment, protective top cover 110 and apron 120 may be manufactured as a single piece of material.

In order to highlight its height and features, apron 120 is illustrated in FIGS. 1A and 1B as extending below the ground. However, it should be understood that, in an actual implementation, depending on height $H_1$, apron 120 would either extend exactly flush with the ground (e.g., if $H_1$ is exactly the height of vehicle 10, i.e., from the bottom of its tires to the top of its roof) or, in a preferred embodiment, extend at least slightly beyond the bottom of the vehicle (e.g., if $H_1$ is greater than the height of vehicle 10) so that it bends outward or inward, or crumples or folds, to lie flush with the ground. While apron 120 could be sized so that it hangs above the ground (e.g., if $H_1$ is less than the height of vehicle 10), it should be understood that this would not be preferred if the objective is to provide a ground seal.

In the embodiment illustrated in FIG. 1A, apron 120 is sealed or fixed (e.g., sewn) to protective cover at connection 122 without any gaps. In the alternative embodiment illustrated in FIG. 1B, apron 120 is detachably fixed to protective cover (e.g., by a zipper between the edge of protective top cover 110 and apron 120) at connection 122 without any gaps.

Advantageously, detachable apron 120, illustrated in FIG. 1B, allows a user to separate apron 120 from protective top cover 110. This enables the user to take apron 120 with him or her. In addition, if protective cover 100 is a vehicle cover, detachable apron 120 enables a user to detach and leave apron 120 on the ground (e.g., with sealing tube 130 remaining in a substantially rectangular shape, representing the outline of the vehicle) and drive into or out of apron 120. In other words, the user only needs to place apron 120 once (e.g., in his or her garage, car port, or other parking space), and does not have to move it (or may only move it infrequently) for all subsequent uses. Furthermore, the user no longer has to lift apron 120 (which may be heavy due to sealing tube 130) over vehicle 10 for each use.

Specifically, when exiting a parking space, a user may detach the top edge of apron 120 from the bottom edge of protective top cover 110 (e.g., by unzipping connection 122). Gravity will force apron 120 to collapse (e.g., crumple or fold) to the ground, but apron 120 will remain in its current outline (e.g., despite rain or other external influences), around vehicle 10, due to the weight of sealing tube 130. The user may remove protective top cover 110 from vehicle 10 and set it aside (e.g., by folding protective top cover 110 and/or placing protective top cover 110 within a storage space of a garage, vehicle 10, etc.). In some instances, the user could take protective top cover 110 with him or her (e.g., place it in a storage compartment of vehicle 10, such as the trunk), and use it elsewhere (e.g., in a public parking space) without apron 120 or with a different apron 120 (e.g., previously placed in another private parking space). The user may drive vehicle 10 out from the surrounding apron 120 by simply driving over one side of apron 120 (i.e., the side in front of or behind vehicle 10). When the user returns to the parking space, the user may again drive over one side of apron 120 to once again position vehicle 10 within the center of apron 120. The user may then place protective top cover 110 over vehicle 10, and pull up and reattach the top edge of apron 120 to the bottom edge of protective cover 110 (e.g., by zipping connection 122), to once again protect vehicle 10 with protective cover 100 having a ground seal formed by sealing tube 130.

Figure 2:
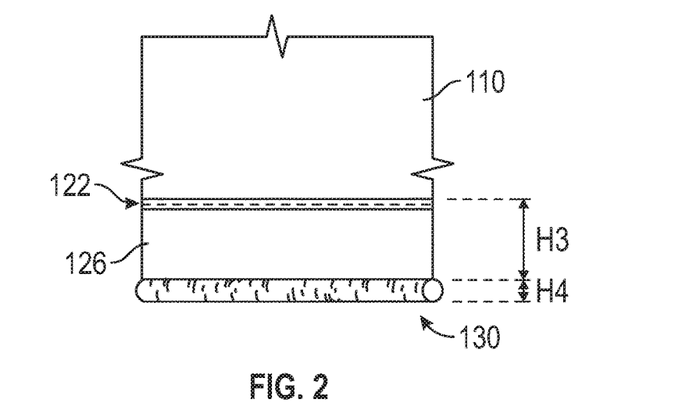
FIG. 2 illustrates an apron of a protective cover, according to an embodiment.

As illustrated in a cut-out view in FIG. 2, apron 120 may comprise an apron extension 126, which extends from connection 122 towards the ground with a height $H_3$. In a preferred embodiment, $H_3$ is at least twelve inches. In the embodiment illustrated in FIG. 1B, with a detachable apron 120, the combined height of apron extension 126 (i.e., $H_3$) and sealing tube 130 (e.g., $H_4$) may be of a sufficient height to make it easy for the user to detach (e.g., unzip) apron 120 without having to uncomfortably bend over or lift sealing tube 130. For example, the total height of apron 120 (i.e., $H_2=H_3+H_4$) may be equal to or greater than eighteen inches.

Figure 3:
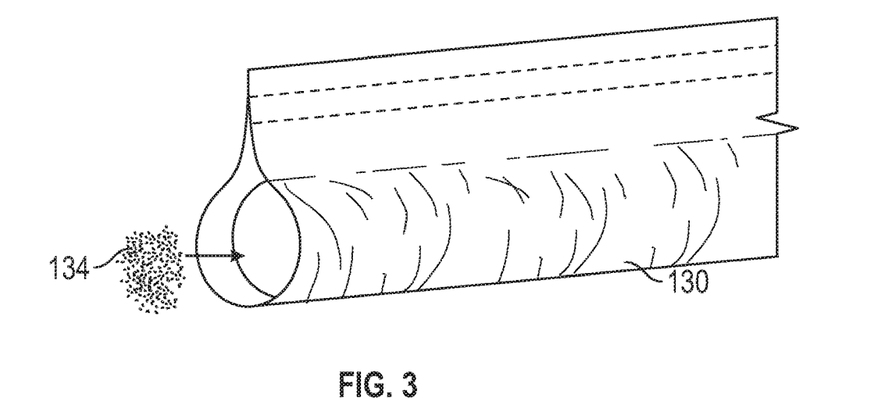
FIG. 3 illustrates a sealing tube of an apron of a protective cover, according to an embodiment.

As illustrated in FIG. 3, conformance to the ground surface, in a resting state of apron 120, may be achieved by a sealing tube 130, which may be filled with a surface contouring material 134. Sealing tube 130 may be sealed or fixed (e.g., sewn) to apron extension 126 to prevent any gaps within apron 120. Contouring material 134 may be a dry material, such as dry, powdered sand or a material with similar characteristics. Alternatively, a wet material, such as water, may be used.

In an embodiment, sealing tube 130 may comprise or be formed as an envelope that contains contouring material 134. The envelope may be at least two-inches wide to ensure that sealing tube 130 is of sufficient size and weight to conform to the ground surface. For example, the envelope may have a substantially cylindrical shape with a diameter of two or more inches. However, a width or diameter of less than two inches may be used (e.g., if the envelope is filled with a heavier contouring material 134).

The type and amount of contouring material 134 and the size of the envelope in sealing tube 130 should be selected to gravitationally seal apron 120 to the ground surface with sufficient weight, so as to prevent or restrict rodents and/or insects from passing underneath sealing tube 130, without compromising the conformance of sealing tube 130 to the ground. If sealing tube 130 is overfilled (e.g., too much sand is used to fill the envelope), sealing tube 130 may not properly conform to the ground. On the other hand, if sealing tube 130 is under-filled (e.g., too little sand is used to fill the envelope), sealing tube 130 may not be heavy enough to seal to the ground. In other words, gaps may form between sealing tube 130 and the ground, or sealing tube 130 may not be heavy enough to restrict the ingress of rodents or insects. A proper amount of contouring material 134 will allow the particles to flow in sealing tube 130, so as to be evenly distributed along the entire length of sealing tube 130.

Figure 4A:
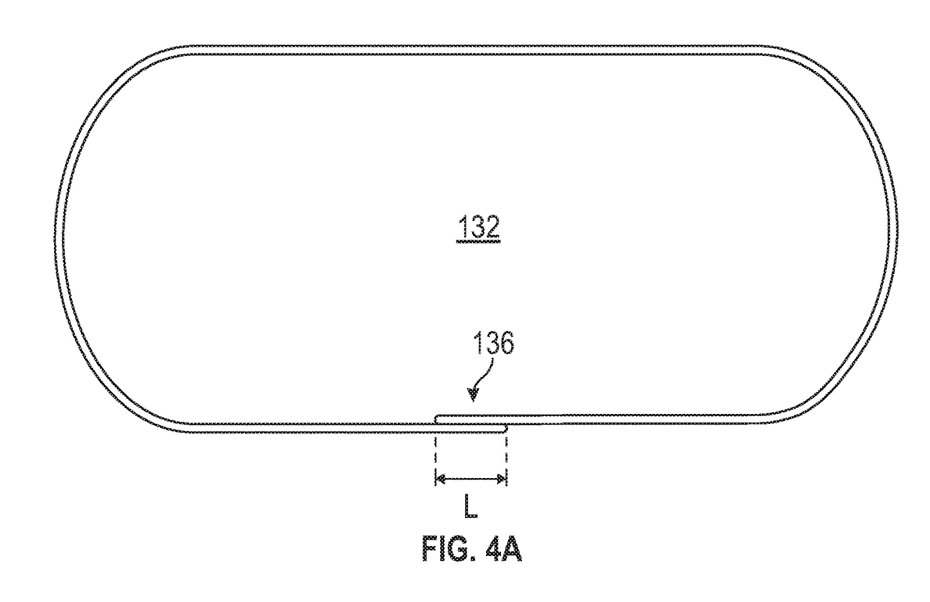
FIGS. 4A-4C illustrates segmentation of an apron of a protective cover, according to embodiments.

FIG. 4A represents a top-down or bottom-up view of apron 120, according to an embodiment. As illustrated in FIG. 4A, in an embodiment, apron 120 (e.g., one or more of connection 122, apron extension 126, and sealing tube 130) may be manufactured as a single linear segment 132. Segment 132 may be bent, and then the two ends of segment 132 may be fixed to each other to form segment 132 into an apron 120 capable of surrounding an object. It should be understood that, as used herein, the term "segment" only refers to the outline of apron 120, and that a single segment may comprise numerous different materials and/or components (e.g., a connection 122, apron extension 126, and/or sealing tube 130 stitched together or otherwise affixed to each other).

Figure 4B:
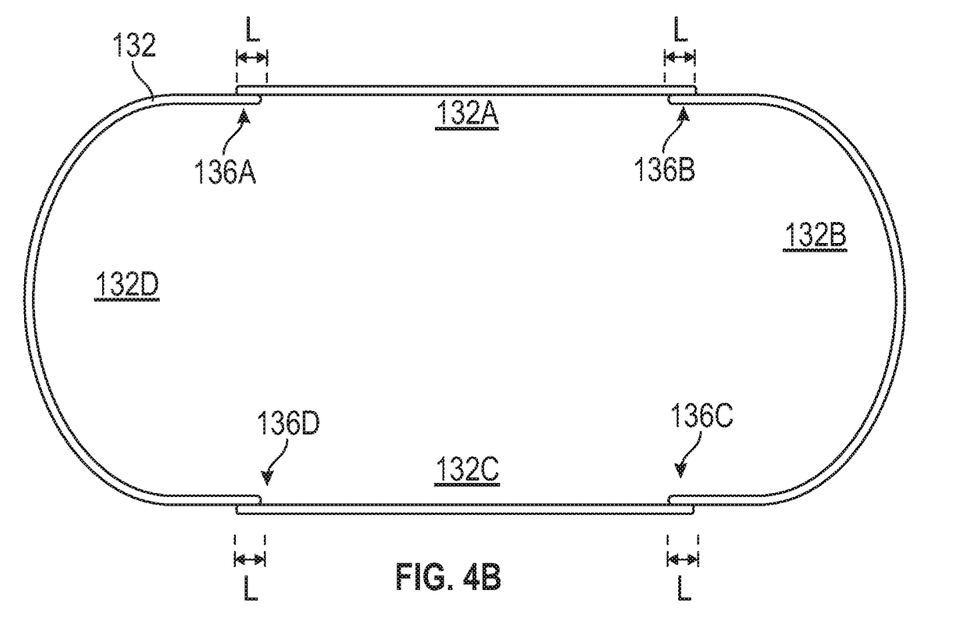
Figure 4C:
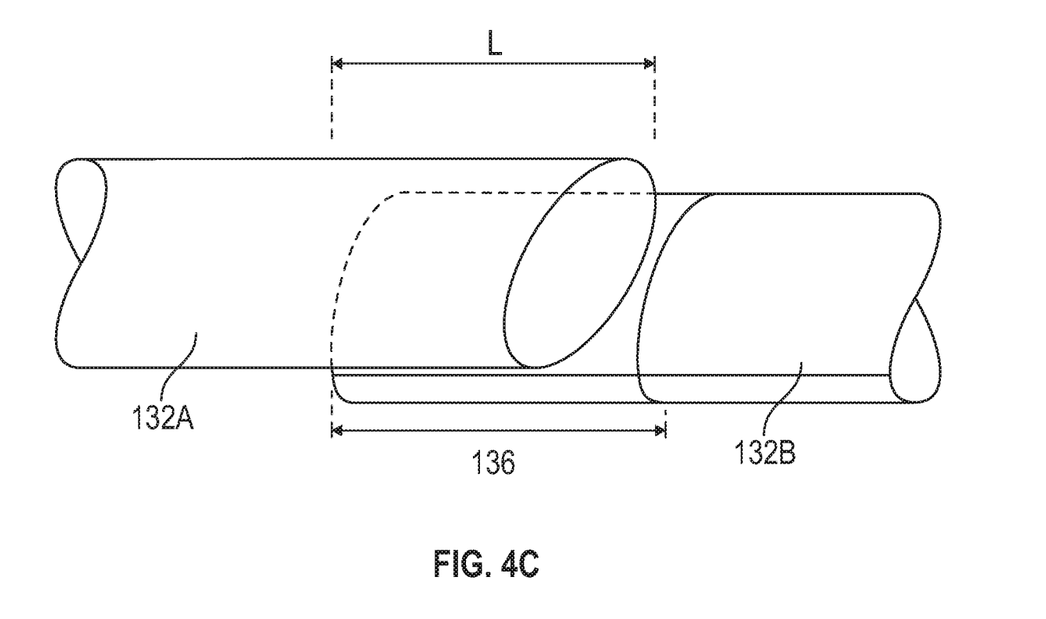

As illustrated in more detail in FIG. 4C, the ends of segment 132 may overlap in overlap region 136 to create a firm seal. Overlap region 136 has a length of L. In an embodiment, L is three or more inches (i.e., a minimum of three inches). The ends of segment 132 may be fixed to each other by any conventional means, including, without limitation, adhesive, stitching, Velcro™, and/or the like.

FIG. 4B represents a top-down or bottom-up view of apron 120, according to an alternative embodiment. As illustrated in FIG. 4B, in the alternative embodiment, apron 120 (e.g., one or more of connection 122, apron extension 126, and sealing tube 130) is segmented into a plurality of segments 132. This enables a user to easily fold protective cover 100 or apron 120 for storage or transportation. While four segments 132A-132D are illustrated, it should be understood that any number of segments 132 may be used. However, improper segmentation can lead to gaps between sealing tube 130 and the ground, which compromises the protective qualities of the ground seal. Thus, as illustrated in more detail in FIG. 4C, each segment 132 may overlap each adjacent segment 132 in overlap regions 136 to create a firm seal. Again, each overlap region 136 has a length of L, which, in an embodiment, is three or more inches (i.e., a minimum of three inches). The ends of segments 136 (e.g., the end of segment 132A and segment 132B in overlap region 136B) may be fixed to each other by any conventional means.

Figure 5:
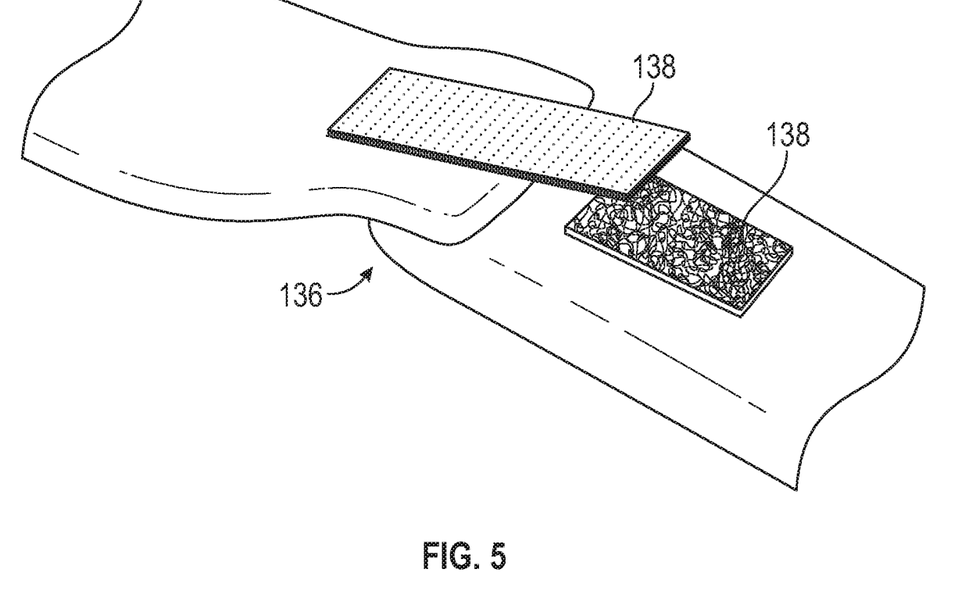
FIG. 5 illustrates fastening between segments of an apron of a protective cover, according to an embodiment.

FIG. 5 illustrates attachable and detachable segments ends which may be used in one or more overlap regions 136, according to an embodiment. As illustrated, a fastener 138 may be used at each overlap region 136 to ensure that the ends of segment(s) 132 remain detachably sealed together at their respective overlap region 136, so as not to compromise the seal between sealing tube 130 and the ground surface and so as not to separate from each other. In the illustrated embodiment, fastener comprises corresponding Velcro™ strips, for example, with a hook strip on the end of one segment 132A and a loop strip on the end of an adjacent segment 132B. However, it should be understood that other types of fasteners are possible.

Figure 6:
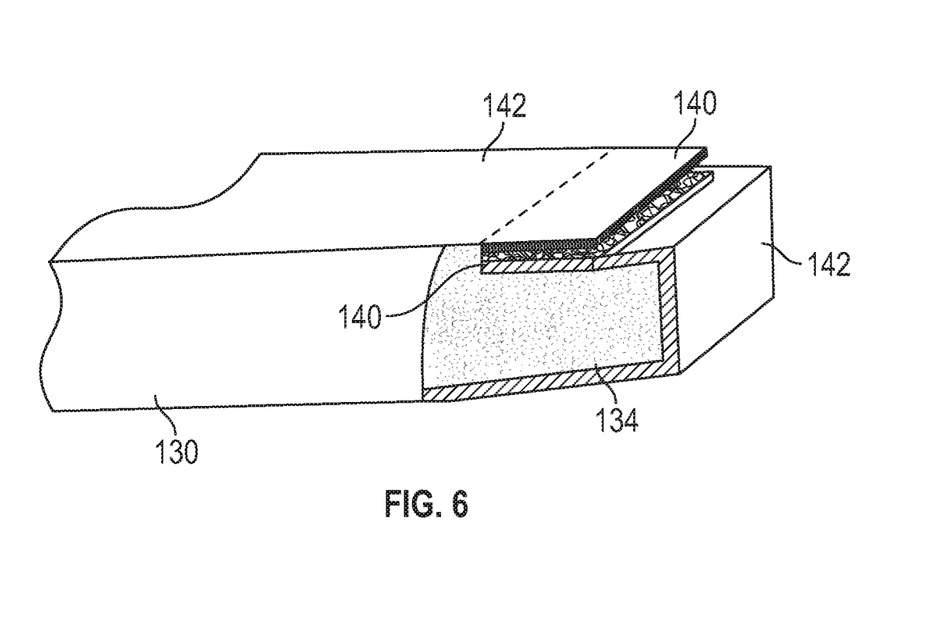
FIG. 6 illustrates fastening of an end of a sealing tube of a segment of an apron of a protective cover, according to an embodiment.

FIG. 6 illustrates a cut-away view of the end of a segment 132 of sealing tube 130, according to an embodiment. As illustrated, a fastener 140 may be used at one or both ends of each segment 132 to retain contouring material 134 within the envelope, formed by fabric 142, of each segment 132. This enables contouring material 134 in sealing tube 130 to be driven over or otherwise compressed (e.g., accidentally or on purpose), while still enabling contouring material 134 to be removed from sealing tube 130 for easier storage or transportation (e.g., shipping). In an embodiment, fastener 140 may comprise corresponding Velcro™ strips, for example, with a hook strip on one surface of the end of segment 132 and a loop strip on an adjacent surface of the end of segment 132. Alternatively, the ends of each segment 132 may be sealed, so as to permanently seal contouring material 134 within the sealing tube of each segment 132.

In the case of a generic protective cover—as opposed to a custom-fitted protective cover—protective top cover 110 may comprise fasteners (e.g., Velcro™ or other types of straps) that can be used to remove slack in protective top cover 110, and keep protective top cover 110 from touching the ground surface. This ensures that only apron 120 (e.g., which may be made of water-proof or water-resistant material) is in contact with the ground surface.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A protective cover comprising:
   a protective top cover comprising one or more edges; and
   an apron extending from the one or more edges of the protective top cover,
   wherein an edge of the apron, opposite the one or more edges of the protective top cover, comprises a sealing tube that contains a compressible, contouring material, so as to form a seal between the edge of the apron and a ground surface when the protective cover is deployed, and
   wherein the apron comprises one or more segments,
   wherein each segment has two segment ends, and
   wherein each segment end is configured to overlap and detachably affix to another segment end, so as to form a releasable seal without any gaps between the segment end and the other segment end.

2. The protective cover of claim 1, wherein the apron is detachable from the one or more edges of the protective top cover.

3. The protective cover of claim 2, wherein the apron is attached to the one or more edges of the protective top cover by a zipper.

4. The protective cover of claim 1, wherein the apron is at least twelve inches wide between the one or more edges of the protective top cover and the sealing tube.

5. The protective cover of claim 1, wherein the one or more segments consist of a single segment.

6. The protective cover of claim 1, wherein the one or more segments are a plurality of segments.

7. The protective cover of claim 5, wherein each overlap region of detachably affixed segment ends is at least three inches wide.

8. The protective cover of claim 5, wherein each segment end is attachable and detachable to another segment end by a fastener.

9. The protective cover of claim 8, wherein the fastener comprises Velcro™.

10. The protective cover of claim 1, wherein at least one end of the sealing tube of each segment comprises a fastener to close the at least one end of the sealing tube, so as to seal the contouring material within the sealing tube, and open the at least one end of the sealing tube, so as to provide access to the contouring material within the sealing tube.

11. The protective cover of claim 10, wherein the fastener comprises Velcro™.

12. The protective cover of claim 1, wherein the contouring material comprises sand.

13. The protective cover of claim 1, wherein the protective cover is configured to cover a vehicle.

14. The protective cover of claim 1, wherein the protective cover is configured to cover furniture.

15. The protective cover of claim 1, wherein the sealing tube is substantially cylindrical.

16. The protective cover of claim 15, wherein the substantially cylindrically sealing tube has a diameter or width of at least two inches.

\* \* \* \* \*